April 19, 1932. W. MORRISON 1,854,418
SIGN
Filed March 9, 1931 2 Sheets-Sheet 1

Webster Morrison, INVENTOR
BY Victor J. Evans and Co. ATTORNEYS

April 19, 1932.  W. MORRISON  1,854,418
SIGN
Filed March 9, 1931   2 Sheets-Sheet 2

Webster Morrison, INVENTOR
BY Victor J. Evans
and Co.  ATTORNEYS

Patented Apr. 19, 1932

1,854,418

UNITED STATES PATENT OFFICE

WEBSTER MORRISON, OF DENVER, COLORADO

SIGN

Application filed March 9, 1931. Serial No. 521,225.

This invention relates to illuminated signs and has for an object the provision of a sign in which the matter displayed will be illuminated, with the color of the light continuously changing, and the colors blending; means being provided for independently changing the coloring of the various characters of the sign, so that a kaleidoscopic effect will be obtained which will add materially to the attractiveness of the sign.

Another object of the invention is the provision of an illuminated sign, which is simple in construction and efficient and reliable in use, and by means of which an attractive advertising display may be obtained.

With the above and other objects in view, the invention further includes the following novel features and details of construction, to be hereinafter more fully described, illustrated in the accompanying drawings and pointed out in the appended claim.

In the drawings:—

Figure 1:
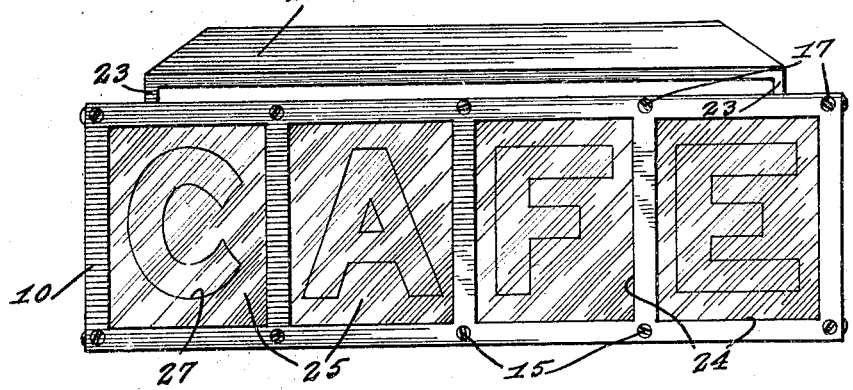
Figure 1 is a front elevation of a sign constructed in accordance with the invention.
Figure 2:
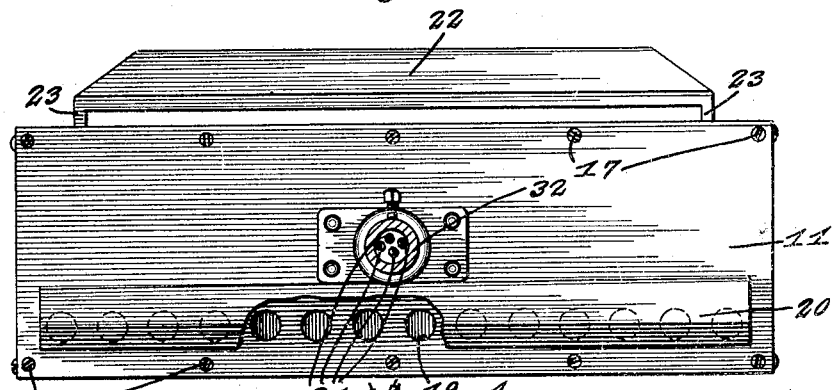
Figure 2 is a rear view with parts broken away.

Referring to the drawings in detail wherein like characters of reference denote corresponding parts, the sign which may be of any suitable size and configuration, is shown as elongated. The casing consists of front and rear walls 10 and 11 respectively, a bottom 12 and a top 13. The bottom is flanged as shown at 14 and is secured between the walls 10 and 11 as shown at 15. The top 13 is likewise flanged as shown at 16 and is similarly secured as shown at 17. The front and rear walls are connected by end walls 18 and the bottom and top are secured between these end walls in the manner just described.

The rear wall is provided with spaced openings 19 which are protected by a hood 20 so as to prevent the entrance of rain and snow, while the top 13 is provided with an opening 21 protected by a hood 22. This hood is spaced above the top and is connected thereto by legs 23. The openings in the rear wall 11 and in the top 13 permit of a circulation of air through the casing.

Figure 3:
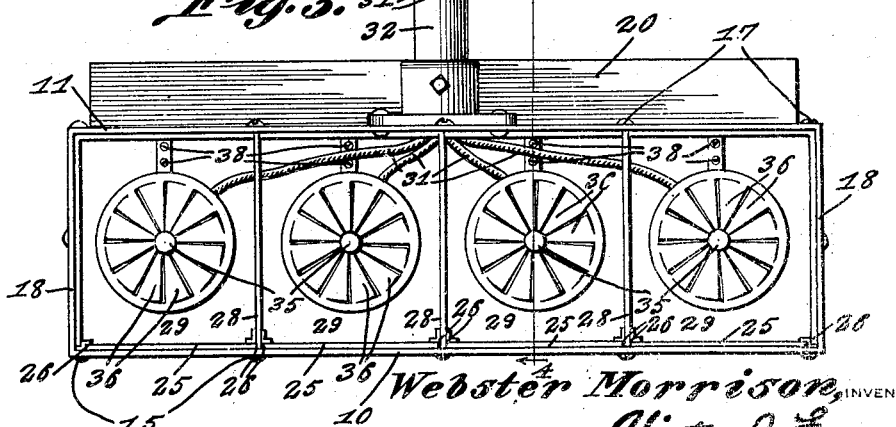
Figure 3 is a top plan view with the top of the casing removed.
Figure 4:
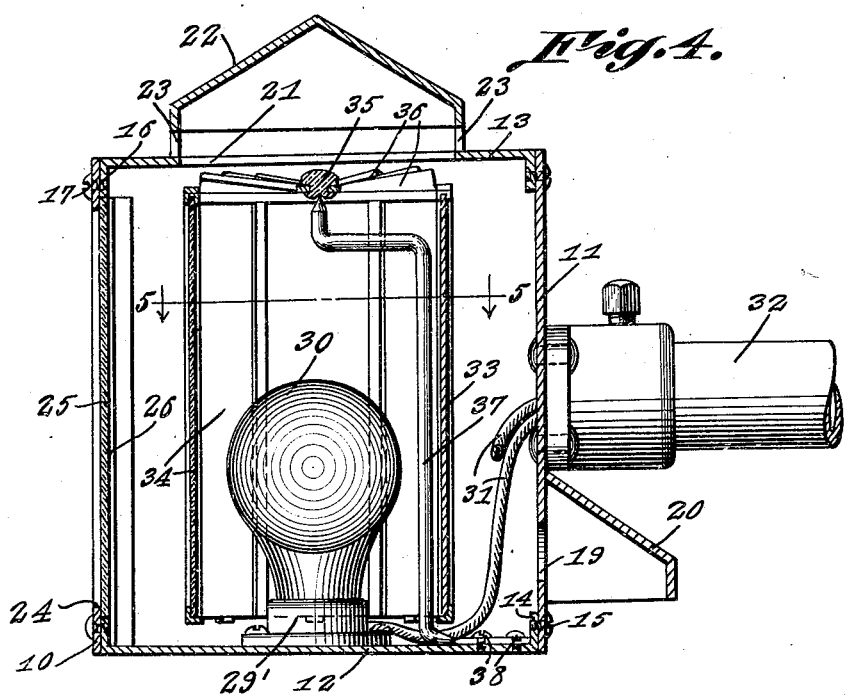
Figure 4 is an enlarged sectional view on the line 4—4 of Figure 3.
Figure 5:
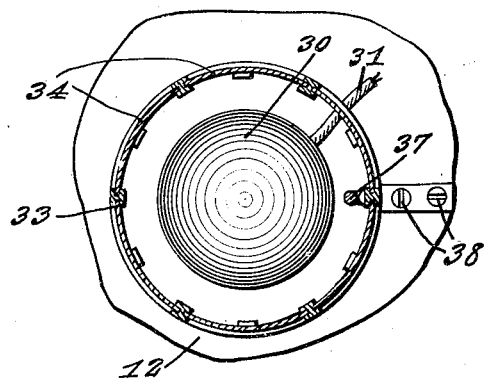
Figure 5 is a detail section on the line 5—5 of Figure 4.

The front wall 10 is provided with spaced openings 24 and removably positioned within these openings are panels 25. These panels are removably mounted within guide grooves 26 provided at opposite edges of the openings 24 by the arrangement of angle bars 26′ secured to the front edges of the partitions and in spaced relation to the front wall as best shown in Figure 3 of the drawings and the lower edges of the panels rest upon the upper edge of the flange 14 at the front of the bottom of the casing. The flange 16 at the top of the casing engages the upper edges of the panels 25 so that these panels are removably and securely held in place. This permits of an interchange of panels to change the advertising display as will be readily apparent. The interchanging of the panels is facilitated through the removal of the top 13 and disengagement of the flanges 16 from the upper edges of the panels. In this manner the panels may be removed and replaced from the top of the casing.

Each of the panels 25 is provided with a transparent character 27. While one of these characters is provided upon each panel, obviously more than one character may be provided, depending upon the character of the advertisement.

The casing is divided by partitions 28 into separate compartments 29, one of the panels 25 forming the front wall for each compartment. Arranged within each compartment is a receptacle 29′ for an electric bulb 30, conductor wires 31 extending into the casing through a pipe or tube 32. Each of the compartments may thus be independently illuminated.

Each of the bulbs 30 is surrounded by a cylindrical frame 33 which carries a plurality of differently colored glass or other panels 34, so that the bulbs 30 are surrounded by these differently colored panels. The upper end of the frame 33 has secured therein a bearing member 35 from which extend a plurality of fan-like blades 36. A bearing arm 37 is secured in the bottom of each compartment as shown at 38, and these arms extend inward beneath the frame 33 and upward with their upper ends offset so as to engage the bearing member 35 and rotatably support the frame 33 with its panels 34.

Air entering the casing through the openings 19 will be heated by the bulbs within the compartments 29. The heat will cause the air to circulate rapidly upward and outward through the top of the casing. This rapidly traveling air will strike the blades 36 and cause the panels 34 to rotate about the bulbs 30. A continuously changing colored light will thus appear in each of the characters 27, so that the different characters will be differently colored with the colors of each character continuously changing and blending. A highly attractive display will thus be provided.

The invention is susceptible of various changes in its form, proportions and minor details of construction and the right is herein reserved to make such changes as properly fall within the scope of the appended claim.

Having described the invention what is claimed is:—

A changeable color sign comprising a casing including a front wall having spaced openings therein, a rear wall, side walls connecting the front and rear walls, a bottom and a top, partitions dividing the casing into separate compartments, opposed flanges spaced from the front wall of the casing within each compartment and defining with said wall spaced guide channels, attaching flanges extending upwardly from the bottom within the casing at the lower ends of the guide channels and forming a bottom for said channels, panels removably positioned within the openings of the front wall and having transparent characters thereon, said panels resting upon the flanges at the bottom of the casing, attaching flanges extending from the top of the casing and providing a closure for the guide channels, and means within the compartments to provide a changing colored light for the transparent characters.

In testimony whereof I affix my signature.

WEBSTER MORRISON.